United States Patent
Cardwell et al.

(10) Patent No.: US 12,546,668 B2
(45) Date of Patent: Feb. 10, 2026

(54) FLUID CONDUIT WITH EMBEDDED SENSORS

(71) Applicant: Cooper-Standard Automotive, Inc., Northville, MI (US)

(72) Inventors: Brian J. Cardwell, Ypsilanti, MI (US); Christopher Edward Couch, Ann Arbor, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 458 days.

(21) Appl. No.: 17/548,741

(22) Filed: Dec. 13, 2021

(65) Prior Publication Data

US 2023/0184593 A1     Jun. 15, 2023

(51) Int. Cl.
*G01K 7/22*     (2006.01)
*B60H 1/00*     (2006.01)
*G01K 7/24*     (2006.01)

(52) U.S. Cl.
CPC ......... *G01K 7/223* (2013.01); *B60H 1/00792* (2013.01); *B60H 1/00807* (2013.01); *G01K 7/24* (2013.01)

(58) Field of Classification Search
CPC .............. G01K 13/002; G01K 13/026
See application file for complete search history.

(56) References Cited

U.S. PATENT DOCUMENTS

| | | | |
|---|---|---|---|
| 4,437,084 A | 3/1984 | Clayton, Jr. | |
| 4,800,000 A * | 1/1989 | Zatko | G01N 27/423 204/406 |
| 5,481,240 A | 1/1996 | Fukaya | |
| 6,588,931 B2 | 7/2003 | Betzner | |
| 11,287,291 B1 * | 3/2022 | Cardwell | G01M 17/007 |
| 2015/0020580 A1 * | 1/2015 | Hoffman | G01K 1/026 73/61.44 |
| 2015/0098486 A1 * | 4/2015 | McMillon | G01K 1/143 374/120 |
| 2019/0011063 A1 | 1/2019 | Braun et al. | |
| 2019/0195398 A1 | 6/2019 | Nüssen et al. | |

OTHER PUBLICATIONS

Machine translation of JP02215438 (Year: 1990).*

* cited by examiner

*Primary Examiner* — Walter L Lindsay, Jr.
*Assistant Examiner* — Andrew V Do
(74) *Attorney, Agent, or Firm* — Paschall & Associates, LLC; Anthony Miologos; James C. Paschall

(57) ABSTRACT

A fluid connector and method for measuring an operating parameter of a fluid conduit is disclosed. The fluid conduit includes a conduit wall enclosing a fluid channel wherein a fluid flows through the fluid channel from a first opening to a second opening. At least one sensor element is embedded within the conduit wall along the direction of the fluid channel between the first opening and the second opening that is used to measure the operating parameter.

18 Claims, 4 Drawing Sheets

FLUID CONDUIT WITH EMBEDDED SENSORS

TECHNICAL FIELD

This disclosure is generally directed to fluid conduits. More specifically, this disclosure is directed to a fluid conduit having embedded sensors for measuring an operating parameter of the fluid conduit2

BACKGROUND

In the automotive industry, knowledge of the operating parameters of certain vehicular conditions such as for example the temperatures and/or temperature variations of the fluids flowing within conduits of vehicular systems is often of great importance. In particular, precise knowledge of the temperature and/or the temperature variation of the fluid conduit components in a fluid circuit such radiators, heat exchangers and/or oil coolers for example may be of crucial importance for the safe operation of the vehicle. It is also crucial to monitor temperature in systems that cool batteries in electric vehicles in order to avoid occurrences of thermal stress and/or overheating, avoiding instances of damage.

Temperature sensors are often used in vehicular systems that measure the temperature of an apparatus or component of a fluid circuit, at the point of the location where the sensors are attached. Measuring the temperature of a material or some other complex shaped and/or inaccessibly arranged component, such as for example fluid conveying tubes of the fluid circuit, often involves great technical difficulties. For this purpose, temperature sensors are often placed and/or adhesively attached on the outer side of the component to be monitored. However, this method has disadvantages in that the temperatures measured by the temperature sensors can be influenced by the temperature surrounding the components and therefore the temperature measurements obtained from these sensors can under various circumstances not be accurate. Additionally, sensors attached to the exterior of components or other devices can be damaged by external environmental hazards such as dirt, water and road debris when operating the vehicle. It is therefore an object of the present disclosure to provide a fluid conduit with an improved arrangement of sensors.

SUMMARY

This disclosure is directed to a fluid conduit having embedded sensors for measuring an operating parameter of the fluid conduit2

In a first embodiment, a fluid conduit is disclosed that that includes a fluid channel enclosed by a conduit wall between a first opening and a second opening, whereby a fluid flows through the fluid channel between the first and the second opening. At least one sensor element is embedded within the conduit wall along the direction of the fluid channel between the first opening to the second opening. The sensor element arranged to sense an operating parameter of the fluid conduit.

In a second embodiment, a method for measuring an operating parameter of a fluid conduit is disclosed, the method comprising providing a fluid conduit having a conduit wall enclosing a fluid channel. The method further includes causing fluid to flow through the fluid channel from a first opening to a second opening and providing at least one sensor element embedded within the conduit wall along the direction of the fluid channel between the first opening and the second opening that measures the operating parameter.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
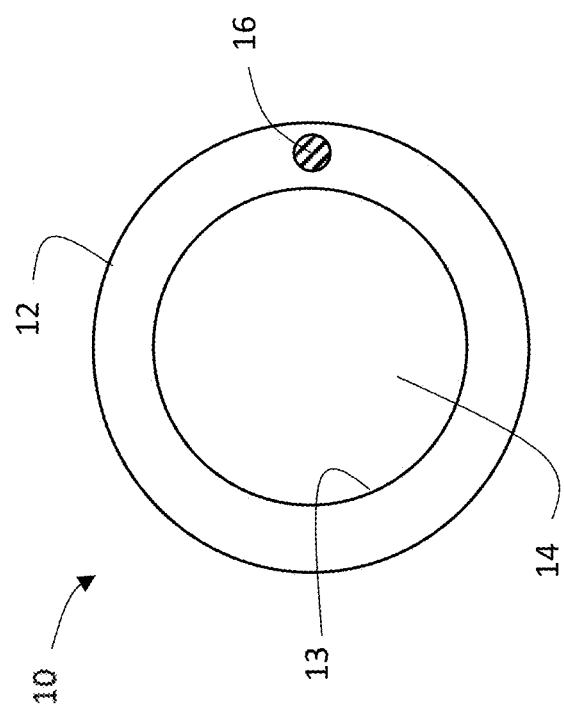
FIG. 1 is a schematic cross-sectional view of a fluid conduit according to a first preferred embodiment of this disclosure.

FIG. 1 shows a fluid conduit 10 according to a first preferred embodiment of the invention in a schematic cross-sectional representation, the fluid conduit 10 being formed as tube. The fluid conduit 10 has a conduit wall 12, which has a cylindrical cross section and forms a conduit channel 14 bounded by the inner side 13 of the conduit wall 12. The fluid conduit 10 is in this case formed in such a way that a fluid can flow through the fluid conduit 10 through the conduit channel 14 between a first opening 15 and a second opening 17 seen at FIG. 3. Openings 15 and 17 are on opposing ends of the fluid channel 14. In particular, the fluid may in this case be under pressure and exert a pressure on the inner wall or inner side 13 of the conduit wall 12.

The fluid conduit 10 has sensor element, in the form of a cylindrical sensor wire 16 embedded in the conduit wall 12 which runs parallel to the conduit wall 12 between openings 15 and 17. The sensor wire 16 illustrated has a circular cross-sectional shape, that is smaller than the wall thickness of the conduit wall 12. Even though in this example a circular cross-sectional shape is illustrated, other cross-sectional shapes may be used such as for example a square, a rectangular or a triangular cross-section. The size of the cross-section of the sensor wire 16 is much smaller than the thickness of the conduit wall 12, so that the conduit wall 12 has a sufficient pressure stability to allow fluid to flow through the fluid conduit 10 with the intended or desired pressure without damaging the fluid conduit 10 or conduit wall 12. For example, the sensor wire 16 and the conduit wall 12 may be formed in such a way that the thickness of the conduit wall 12 is at least twice the cross-section of the sensor wire 16.

Figure 2:
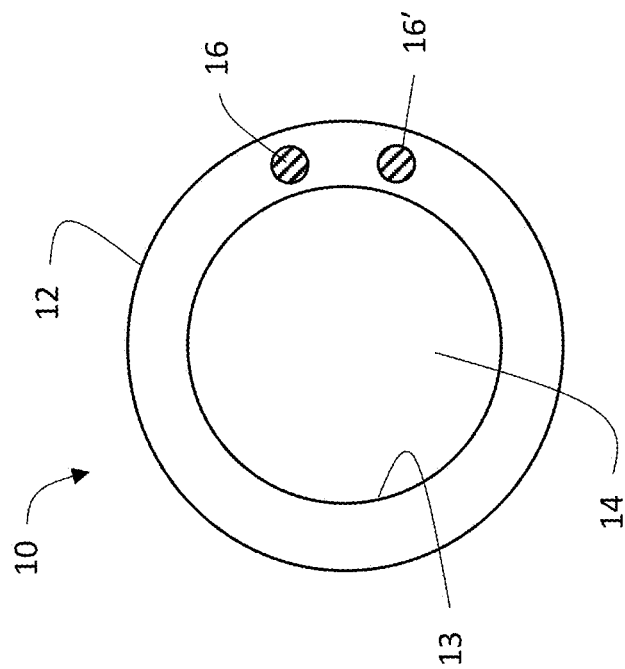
FIG. 2 is a schematic cross-sectional view of a fluid conduit according to a second preferred embodiment of this disclosure.
Figure 3:
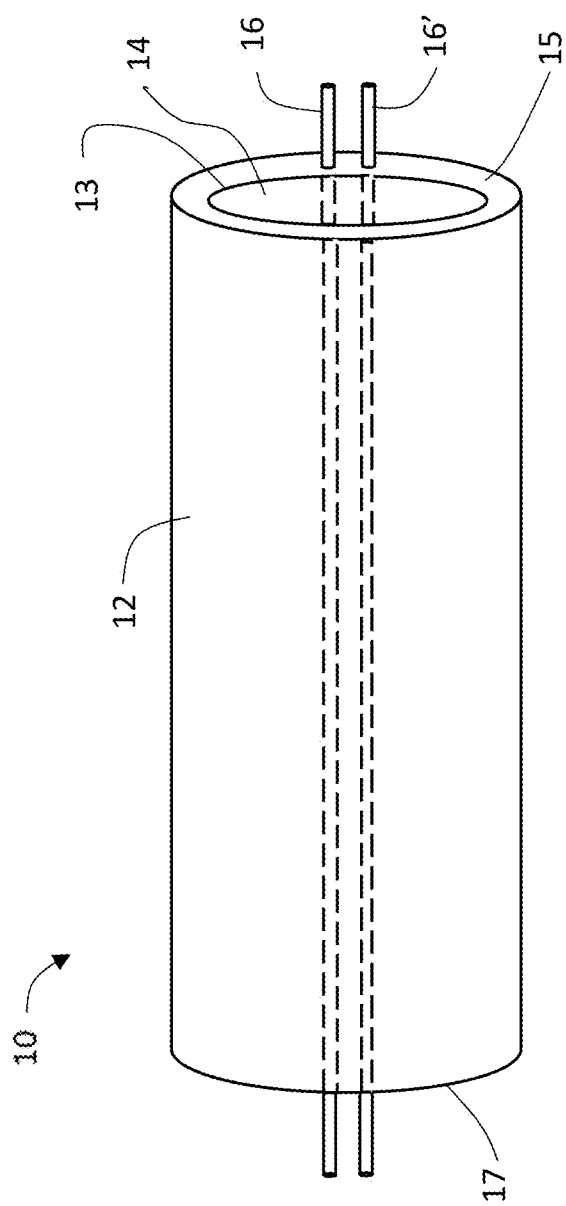
FIG. 3 is a is a schematic perspective view of the fluid conduit according to the second preferred embodiment of this disclosure.

FIG. 2 shows a fluid conduit 10 according to a second preferred embodiment in a cross-sectional representation. The embodiment of FIG. 2 differs from the embodiment shown in FIG. 1 in particular in that two sensor wires 16 and 16' are embedded in the conduit wall 12, with each sensor wire 16 and 16' running parallel to the other and both parallel to the conduit wall 12 between the first and second opening 15, 17. As is seen in FIG. 3, at the respective openings 15, 17 of the conduit 10 the ends of the sensor wires 16 and 16' extend outward from the conduit wall 12 to allow an electrical connection between the sensor wires 16, 16' and measurement device, such as meter or other measurement device which will be explained in more detail below. The meter providing readings of an operating parameter of the fluid conduit such as for example the temperature or temperature variation of the fluid flowing through the channel 14 and conducted into the conduit wall 12 through inner side 13.

In the present disclosure the sensor wires 16, 16' are contemplated to be composed of an alloy resistive wire that change resistance with the application of heat. The sensor wire 16, 16' can be formed from a material configured to make a positive temperature coefficient (PTC) sensor. Sensors composed of PTC materials exhibit increases in resistance as temperature rises. Initially, the current through a PTC sensor will rise sharply with the low resistance but then decrease to zero when the design temperature is reached. The sensor wires 16, 16' can also be composed of an alloy resistive wire using negative temperature coefficient (NTC) sensor material. Sensors composed of NTC sensor material, exhibit decreases in resistance as temperature rises, usually due to an increase in conduction electrons bumped up by thermal agitation from the valence band. NTC sensors are more commonly used as temperature sensors, or in series with a circuit as an inrush current limiter. In the present disclosure the sensor wire 16, 16' is being used to read the temperature of the fluid conduit 10 and therefore the wire sensors 16, 16' may be formed from either NTC or PTC sensor material.

It should be noted that the of present disclosure uses sensor wires 16, 16' to sense the operating parameter of the temperature of the fluid flowing in channel 14 and acting on the inner surface 13 of conduit call 12. Other operating parameters, such as for example pressure variation and/or a variation in the composition of matter of the fluid flowing through channel 14 can also be measured when provided with the proper sensor material. For example, the sensor wire 16, 16' can be formed from a material that acts as a strain gauge to provide a direct material-based connection by way of an electrical connection to the sensor wires 16, 16' of the pressure exerted on the inner side 13 of the conduit wall 12.

Preferably, the fluid conduit 10, and sensor wires 16, 16' are constructed using a coextrusion manufacturing process. The fluid conduit 10 is extruded and formed from a thermoplastic material and at the same time an ingot of sensor alloy material is passed through a die to extrude the sensor wires 16, 16' to form a conjoint merging of the sensor wires within wall 12 of fluid conduit 10. In this manner sections of fluid conduit 10 at various lengths may be manufactured that includes integrated sensor elements in the form of sensor wires 16, 16' embedded in the fluid conduit wall 12.

Figure 4:
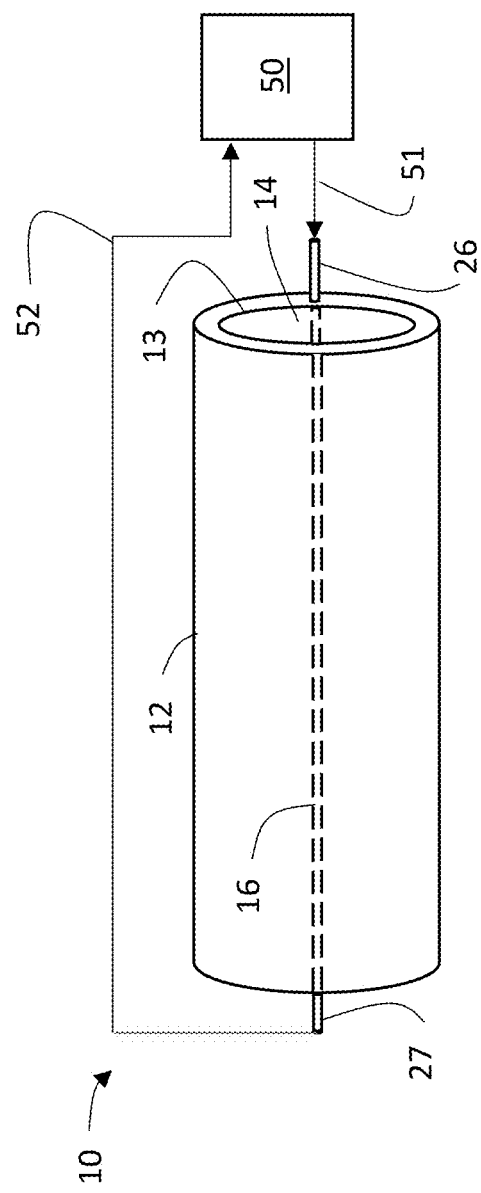
FIG. 4 is a schematic perspective view of the fluid conduit of the first embodiment electrically connected to a resistance reading meter according to this disclosure.
Figure 5:
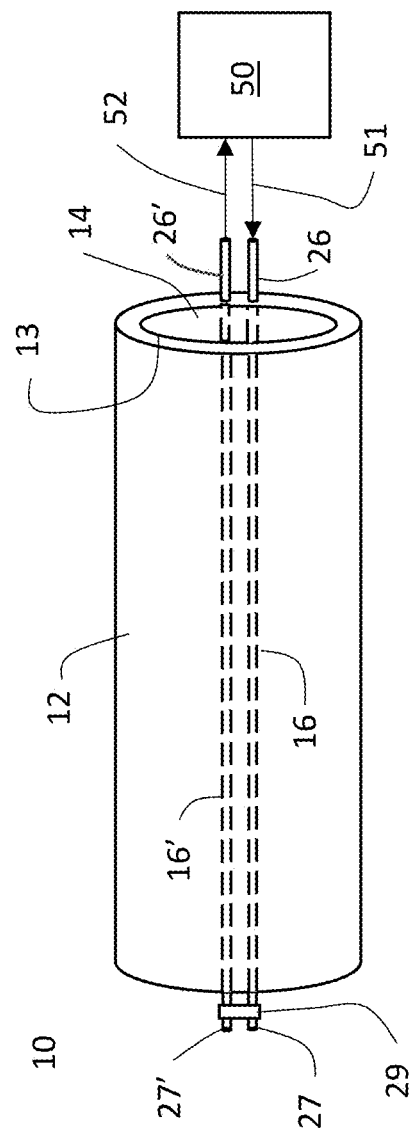
FIG. 5 is a schematic perspective view of the fluid conduit of the second embodiment electrically connected to a resistance reading meter according to this disclosure.

Referring now to FIGS. 4 and 5 a schematic perspective view of the fluid conduit 10 of the first and second embodiments are illustrated electrically connected to a resistance reading meter 50. In FIG. 4 a first electrical connection is made between a first electrical line 51 of the resistance meter 50 and a first end 26 of the sensor wire 16. A second electrical connection is made between a second electrical line 52 of the resistance meter 50 and a second end 27 of the sensor wire 16. The temperature of a fluid flowing through the channel 14 and conducted into fluid conduit wall 12 through inner surface 13 would cause the sensor wire 16 to change its resistance. The change in resistance would be applied by electrical lines 51, 52 to the resistance meter 50, wherein the meter would output a reading of the resistance to a user on a display. Additionally, the resistance meter 50 may also be designed to convert resistance readings to a temperature providing a display of the temperature of the fluid flowing in the fluid conduit to the user.

In FIG. 5 electrical line 51 is electrically connected to a first end 26 of sensor wire 16 and the second electrical line 52 to the first end 26' of sensor wire 16'. The second ends 27, 27' of sensor wires 16, 16' are electrically tied together by either crimping the ends 27, 27' together, or using a shunt device 29. By electrically tying sensor wires 27, 27' together a more convenient and cost effective method of connecting the resistance meter 50 to the sensor wires 16, 16' is made, dispensing with the need of running the second electrical line 52 back to the resistance meter 50. Additionally, a more accurate sensor reading of the temperature of the fluid conduit 10 is made, since the sensor wire 16, 16' is now electrically twice the length of the single wire sensor 16 of FIG. 4, thereby covering a greater area of the conduit wall 12. As was explained above, the temperature of a fluid flowing through the channel 14 and conducted into fluid conduit wall 12 through inner surface 13 would cause the sensor wires 16, 16' to change resistance. The change in resistance would be applied by electrical lines 51, 52 to the resistance meter 50, wherein the meter would output a reading of the resistance and/or convert the resistance into a temperature for display to a user.

Figure 6:
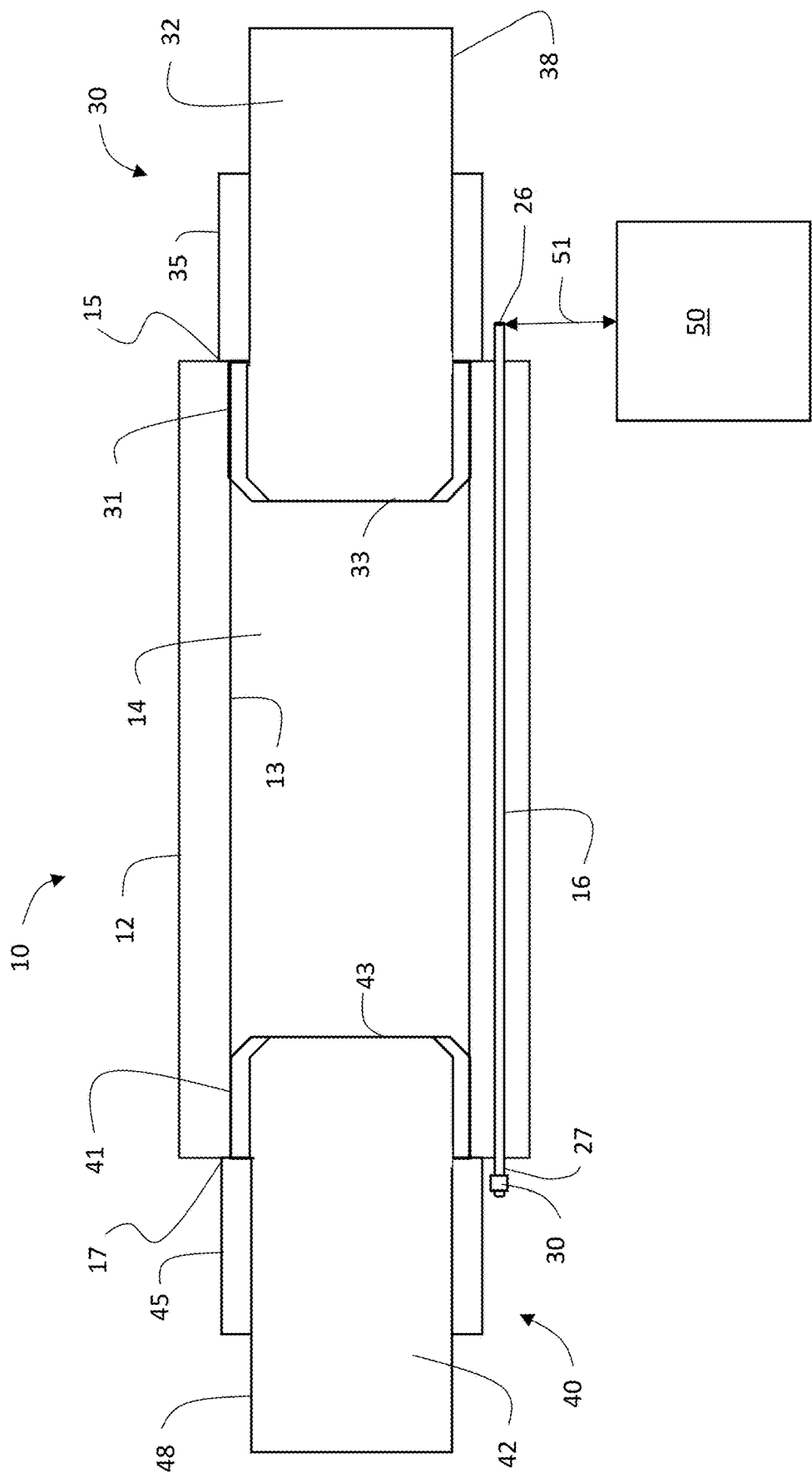
FIG. 6 is a schematic cross sectional-view of the fluid conduit having fluid fittings coupled to the fluid conduit openings, according to this disclosure.

With reference to FIG. 6 a schematic cross sectional-view of the fluid conduit 10 is shown having fluid fittings 30 and 40 coupled to openings 15, 17 respectively of the conduit 10. The fluid fittings 30 and 40 are used to couple another fluid conduit, a tube, or a functional component of a cooling circuit, such as a radiator or heat exchanger to the fluid conduit 10. Each fluid fitting 30, 40 includes a cylindrical body 35, 45 having a cylindrical diameter slightly larger than the channel 14. A cylindrical coupling end 31, 41 extends from on one end of the body 35, 45 and a tube 38, 48 extends from the body 35, 45 from an end opposite the coupling end 31, 41. An interior passage 32, 42 is formed in each fitting 30, 40 leading from the tube 38, 48 to an opening 33, 43. Each coupling end 31, 41 has an external diameter slightly larger than the internal diameter of inner surface 13 that provides a fluid tight friction fit seal between each coupling end 33, 43 and the inner wall 13. Other devices such as flanges or barbs (not shown) can be located about the exterior diameter of coupling end 31, 42 to aid in providing the fluid tight seal between the fluid fittings 30, 40 and the fluid conduit 10.

The fluid fittings 30, 40 connect the fluid conduit 10 into the fluid flow of a vehicle's cooling circuit. For example, fitting 30 may provide the fluid from the upstream side of the cooling circuit. Fluid flows into channel 15 of fluid conduit 10 from tube 38, through passage 32 exiting opening 33 into channel 15. Fitting 40 located on the downstream side of the fluid flow through channel 14 receives the fluid through opening 43 and into passage 42 to be carried way by tube 48.

Even though the flow is described in this example as from fitting 30 to fitting 40 the opposite flow may be established providing a fluid flow from fitting 40 to 30.

The temperature or other operating parameter of the fluid in the channel 14, can be read by sensor wire 16, 16' (16' not shown) embedded in wall 12. As was explained above, the temperature of a fluid flowing through the channel 14 and conducted into fluid conduit wall 12 through inner surface 13 would cause the sensor wires 16, 16' to change resistance. The change in resistance would be applied by electrical line 51, 52 (52 not shown) to the resistance meter 50, wherein the meter would output a reading of the resistance and/or convert the resistance into a temperature for display to a user.

In this manner the fluid conduit 10 can be inserted in any convenient location in a cooling circuit to provide a reading of the temperature or any other operating parameter than may be required to be monitored within a vehicles cooling circuit.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fluid conduit having a fluid channel enclosed by a conduit wall between a first opening and a second opening;
    a fluid flowing through the fluid channel between the first and the second opening; and
    a sensor element comprised of at least one sensor wire embedded within the conduit wall and traversing through the conduit wall parallel to the fluid channel from the first opening to the second opening, the sensor wire arranged to sense an operating parameter of the fluid conduit including the temperature of the conduit wall as affected by the temperature of the fluid flowing in the fluid channel,
    wherein the at least one sensor wire extends from the conduit at the first opening and the second opening and a first fluid fitting is coupled to the first opening and to the fluid flowing in the fluid channel.

2. The fluid conduit according to claim 1, wherein the at least one sensor wire changes its resistance with the temperature of the conduit wall.

3. The fluid conduit according to claim 2, wherein the sensor element is comprised of a first sensor wire and a second sensor wire embedded in the conduit wall substantially parallel to each other and wherein the first and second sensor wires change their resistance with the temperature of the conduit wall.

4. The fluid conduit according to claim 3, wherein the first sensor wire is electrically connected to the second sensor wire.

5. The fluid conduit according to claim 4, wherein the first and the second sensor wires are composed of positive temperature coefficient (PTC) alloy material.

6. The fluid conduit according to claim 4, wherein the first and the second sensor wires are composed of a negative temperature coefficient (NTC) alloy material.

7. The fluid conduit according to claim 4, wherein the first and second sensor wires extend from the conduit at the first opening.

8. The fluid conduit according to claim 7, wherein the first and second sensor wires are electrically connected at the conduit second opening and wherein a second fluid fitting is coupled to the second opening and to the fluid flowing in the fluid channel.

9. The fluid conduit according to claim 7, wherein a device for reading the resistance of the first and second sensor wires is arranged to be connected to the first and second sensor wires extending from the fluid conduit first opening.

10. The fluid conduit according to claim 9, wherein the device for reading converts the resistance reading to a temperature.

11. A method for sensing an operating parameter of a fluid conduit, the method comprising;
    providing a fluid conduit having a conduit wall enclosing a fluid channel;
    causing fluid to flow through the fluid channel from a first opening to a second opening; and
    providing a sensor element comprised of at least one sensor wire embedded within the conduit wall traversing through the conduit wall parallel to the fluid channel from the first opening to the second opening arranged to sense the operating parameter including the temperature of the conduit wall as affected by the temperature of the fluid flowing in the fluid channel,
    wherein the at least one sensor wire extends from the fluid conduit at the first opening and the second opening and a first fluid fitting is coupled to the first opening and to the fluid flowing in the fluid channel.

12. The method of claim 11, wherein the at least one sensor wire changes its resistance with the temperature of the conduit wall.

13. The method of claim 12, wherein the sensor element is comprised of a first sensor wire and a second sensor wire, the method further including;
    embedding the first sensor wire and the second sensor wire in the conduit wall substantially parallel to the other, each sensor wire arranged to change its resistance with the temperature of the conduit wall.

14. The method of claim 13, wherein the first sensor wire is electrically connected to the second sensor wire.

15. The method of claim 14, wherein the first and the second sensor wire is composed from a positive temperature coefficient (PTC) alloy material.

16. The method of claim 14, wherein the first and the second sensor wire is composed from a negative temperature coefficient (NTC) alloy material.

17. The method of claim 14, wherein the first and second sensor wires extend from the conduit at the first opening, the method further including:

electrically connecting a device to the first and second sensor wires extending from the fluid conduit that reads the resistance of the wires, wherein the device converts the resistance to a temperature.

18. The method of claim 17, wherein the first and second sensor wires are electrically connected at the conduit second opening, the method further including:

coupling a second fluid fitting to the second opening and to the fluid flowing in the fluid channel.

* * * * *